United States Patent
Shin et al.

(10) Patent No.: US 9,398,401 B2
(45) Date of Patent: Jul. 19, 2016

(54) APPARATUS, METHOD AND SYSTEM FOR LOCAL WIRELESS DATA COMMUNICATION OF HYBRID FORM

(71) Applicant: SK PLANET CO., LTD., Gyeonggi-Do (KR)

(72) Inventors: Chul Yong Shin, Seoul (KR); Jae Hyung Huh, Gyeonggi-Do (KR)

(73) Assignee: SK PLANET CO., LTD. (KR)

( * ) Notice: Subject to any disclaimer, the term of this patent is extended or adjusted under 35 U.S.C. 154(b) by 0 days.

(21) Appl. No.: 14/623,093

(22) Filed: Feb. 16, 2015

(65) Prior Publication Data

US 2015/0327000 A1  Nov. 12, 2015

(30) Foreign Application Priority Data

May 7, 2014 (KR) .................. 10-2014-0054196

(51) Int. Cl.
| | |
|---|---|
| *H04M 3/16* | (2006.01) |
| *H04W 4/00* | (2009.01) |
| *H04W 48/16* | (2009.01) |
| *H04W 76/02* | (2009.01) |

(52) U.S. Cl.
CPC .............. *H04W 4/008* (2013.01); *H04W 48/16* (2013.01); *H04W 76/021* (2013.01)

(58) Field of Classification Search
CPC ... H04W 4/008; H04W 48/16; H04W 76/021; H04W 12/06; H04W 4/02
USPC ....................... 455/515, 421, 456.1, 411, 41.2
See application file for complete search history.

(56) References Cited

U.S. PATENT DOCUMENTS

| | | | | |
|---|---|---|---|---|
| 2002/0077060 A1* | 6/2002 | Lehikoinen | ........ | G06Q 30/0241 455/41.2 |
| 2004/0131034 A1* | 7/2004 | Sugaya | .................. | H04W 48/12 370/337 |
| 2008/0280624 A1* | 11/2008 | Wrappe | .................... | G01S 1/68 455/456.1 |
| 2009/0201377 A1* | 8/2009 | Okano | ............... | H04N 1/00347 348/207.1 |
| 2010/0309893 A1* | 12/2010 | Zhu | ........................ | H04W 48/16 370/338 |
| 2011/0164595 A1* | 7/2011 | So | .......................... | H04W 12/06 370/338 |
| 2011/0187591 A1* | 8/2011 | Walker, Sr. | ............. | G01S 19/46 342/357.29 |
| 2011/0281557 A1* | 11/2011 | Choi | .................... | H04L 63/0853 455/411 |
| 2012/0064855 A1* | 3/2012 | Mendelson | .......... | G01C 21/206 455/404.2 |
| 2013/0143499 A1* | 6/2013 | Ando | ..................... | H04W 4/021 455/41.2 |
| 2015/0029945 A1* | 1/2015 | Do | ......................... | H04W 76/02 370/329 |
| 2015/0304950 A1* | 10/2015 | Li | ..................... | H04W 52/0216 370/311 |
| 2015/0327000 A1* | 11/2015 | Shin | ...................... | H04W 4/008 455/41.2 |

* cited by examiner

*Primary Examiner* — Md Talukder
(74) *Attorney, Agent, or Firm* — Baker Hostetler LLP (57) ABSTRACT

A device, method and system for hybrid-typed local wireless data communication are disclosed. The device for hybrid-typed local wireless data communication includes a communication unit which performs communication with one or more terminals through a plurality of local wireless data communication systems and transmits a hybrid-typed beacon signal to the one or more terminal; and a beacon control unit which includes a hybrid module supporting functions for the plurality of local wireless data communication systems, generates the hybrid-typed beacon signal at a preset period or a request through the hybrid module, and transmits the generated hybrid-typed beacon signal to the one or more terminals.

9 Claims, 5 Drawing Sheets

APPARATUS, METHOD AND SYSTEM FOR LOCAL WIRELESS DATA COMMUNICATION OF HYBRID FORM

CROSS-REFERENCE TO RELATED APPLICATION

This application claims the benefit of Korean Application No. 10-2014-0054196, filed on May 7, 2014, with the Korean Intellectual Property Office, the disclosure of which is incorporated herein by reference.

BACKGROUND OF THE INVENTION

1. Field of the Invention

The present invention relates to local wireless data communication and more particularly, to an apparatus, method and system for hybrid-typed local wireless, data communication, which is capable of broadcasting a hybrid-typed beacon signal from a beacon device supporting functionality for various types of local wireless communications and recognizing the broadcast beacon signal to receive a relevant service.

2. Description of the Related Art

This section is just to provide background information for embodiments of the present invention but does not constitute any prior art.

With development of mobile communication networks and advance of terminal specifications, mobile communication terminals became necessaries of modern people beyond a category of simple communication devices or information providing devices and have a tendency of evolution to total entertainment devices.

In addition, techniques for performing local wireless data communication between local mobile communication terminals have been rapidly developed. Examples of these local wireless data communication techniques may include Bluetooth, WiFi and other communication systems. The Bluetooth communication ran into evolutions from Bluetooth Classic. Recently, a BLE (Bluetooth Low Energy) technique is being in wide use for smart phones, retail geofencing, mobile payments and so on.

For such local wireless data communication, a mobile communication terminal accesses a beacon device recognized by scanning a beacon signal broadcast from the beacon device. Such a beacon device is installed in different sites depending on their purpose and a user's mobile communication terminal recognizes the beacon signal, identifies a unique value of the beacon device and receives an appropriate service from the beacon device.

In general, a beacon device is manufactured under application of techniques of individual communication systems such as Bluetooth Classic, BLE (Bluetooth Low Energy), WiFi and the like. However, if a user terminal cannot support the techniques of the communication systems applied to the beacon device depending on user terminal environments, the user terminal cannot receive a beacon signal broadcast from the beacon device and accordingly cannot recognize the beacon device.

RELATED TECHNICAL DOCUMENT

Patent Document

Korean Patent Application Laid-Open No. 2002-0059792 (titled as: "Portable Device interoperating with beacons, published on Jul. 13, 2002)

SUMMARY OF THE INVENTION

To overcome the above problems, it is an object of the present invention to provide a device, method and system for hybrid-typed local wireless data communication which is capable of transmitting a hybrid-typed beacon signal generated at a preset period or a request through a hybrid module which is included in a beacon device and supports functions for a plurality of local wireless data communication systems It is another object of the present invention to provide a device, method and system for hybrid-typed local wireless data communication which is capable of executing an application received from a service device to receive a hybrid-typed beacon signal broadcast from a beacon device through local wireless data communication supported according to terminal environments, checking unique beacon identification information contained in the received hybrid-typed beacon signal, transmitting the checked unique identification information to the service device, and receiving service information corresponding to the unique beacon identification information.

To achieve the above objects, according to an aspect of the invention, there is provided a beacon device including: a communication unit which performs communication with one or more terminals through a plurality of local wireless data communication systems and transmits a hybrid-typed beacon signal to the one or more terminal; and a beacon control unit which includes a hybrid module supporting functions for the plurality of local wireless data communication systems, generates the hybrid-typed beacon signal at a preset period or a request through the hybrid module, and transmits the generated hybrid-typed beacon signal to the one or more terminals.

In some embodiments, the hybrid module may be configured by a combination of two or more of Bluetooth Classic, Bluetooth Low Energy and WiFi communication systems.

In some embodiments, the beacon control unit may generate a first beacon signal at a preset first broadcasting period according to a first local wireless communication system, broadcast the generated first beacon signal as the hybrid-typed beacon signal, generate a second beacon signal at a preset second broadcasting period according to a second local wireless communication system, and broadcast the generated second beacon signal as the hybrid-typed beacon signal, In some embodiments, upon receiving a beacon identification information request signal from a particular terminal, the beacon control unit may generate a third beacon signal containing its own unique beacon identification information and transmit the generated third beacon signal, as the hybrid-typed beacon signal, to the particular terminal.

In some embodiments, the hybrid-typed beacon signal may contain unique beacon identification information according to the local wireless data communication system, and the beacon identification information may include one or more of a unique identifier, transmission power and a beacon signal broadcasting period.

According to another aspect of the invention, there is provided a terminal including: a communication unit which receives a hybrid-typed beacon signal from a beacon device supporting functions for a plurality of local wireless data communication systems and is associated with a service device via a communication network; and a control unit which is functionally coupled to the communication unit, executes an application received from the service device to receive the hybrid-typed beacon signal through local wireless data communication supported according to terminal environments, checks the unique beacon identification information of the beacon device through the received hybrid-typed beacon signal, transmits the checked unique beacon identification to the service device, and receives service information corresponding to the unique beacon identification information from the service device.

In some embodiments, when a first local wireless communication system is supported, the control unit may scan a first hybrid-typed beacon signal broadcast at a preset first broadcasting period through first local wireless communication, and transmit unique beacon identification information contained in the scanned first beacon signal to the service device.

In some embodiments, when a second local wireless communication system is supported, the control unit may scan a second hybrid-typed beacon signal broadcast at a preset second broadcasting period through second local wireless communication, and transmit unique beacon identification information contained in the scanned second beacon signal to the service device.

In some embodiments, when a third local wireless communication system is supported, the control unit may transmit a beacon identification information request signal to the beacon device through third local wireless communication and, upon receiving a third beacon signal from the beacon device, transmit unique beacon identification information contained in the received third beacon signal to the service device.

According to another aspect of the invention, there is provided a hybrid-typed local wireless data communication method including: by a beacon device, generating a hybrid-typed beacon signal at a preset period or a request through a hybrid module supporting a plurality of local wireless data communication systems; by the beacon device, transmitting the generated hybrid-typed beacon signal to one or more terminals; by the one or more terminals, receiving the hybrid-typed beacon signal through local wireless data communication supported according to terminal environments; by the one or more terminals, checking unique beacon identification information of the beacon device through the received hybrid-typed beacon signal; by the one or more terminals, requesting a service device for service information provided in a certain space where the beacon device is located, by using the checked unique beacon identification information; by the service device, receiving the checked unique beacon identification information from the one or more terminals; and by the service device, transmitting service information provided in the certain space mapped to the received unique beacon identification information to the one or more terminals.

According to another aspect of the invention, there is provided a non-transitory computer-readable storage medium storing a computer program comprising a set of instructions, when executed, arranged to cause a computer to implement the above-described method.

According to the present invention, by constructing a hybrid module supporting functions for a plurality of local wireless data communication systems in a single beacon device with no need to individually install beacon devices to cover all of the plurality of local wireless data communication systems, beacons signals generated in the single beacon device according to the plurality of local wireless data communication systems can be broadcast or transmitted to a relevant terminal at a preset period or a request.

Accordingly, the present invention has an advantage in that installation and management costs of beacon devices can be saved and services can be offered through communication with more user terminals in a certain space such as a store and so on.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, preferred embodiments of the present invention will be described in detail with reference to the accompanying drawings. In the following detailed description of the present invention, concrete description on related functions or constructions will be omitted if it is deemed that the functions and/or constructions may unnecessarily obscure the gist of the present invention. Throughout the drawings, the same elements are denoted by the same reference numerals.

Terminologies and wordings used in the following description and the claims should not be construed to be limited to ordinary or dictionary meanings but should be construed to have meanings and concepts matching the technical ideas of the present invention, based on the principle that the present inventors can properly define their own invention with concepts of terminologies and wordings explained in best ways. Accordingly, embodiments described in the specification and elements shown in the drawings are illustrative only and do not cover all of the technical ideas of the present invention. It should be, therefore, understood that these embodiments and elements may be replaced with different equivalents and modifications at the point of time of filing the present application.

A hybrid-typed local wireless data communication system according to an embodiment of the present invention will be first described with reference to the drawings.

Figure 1:
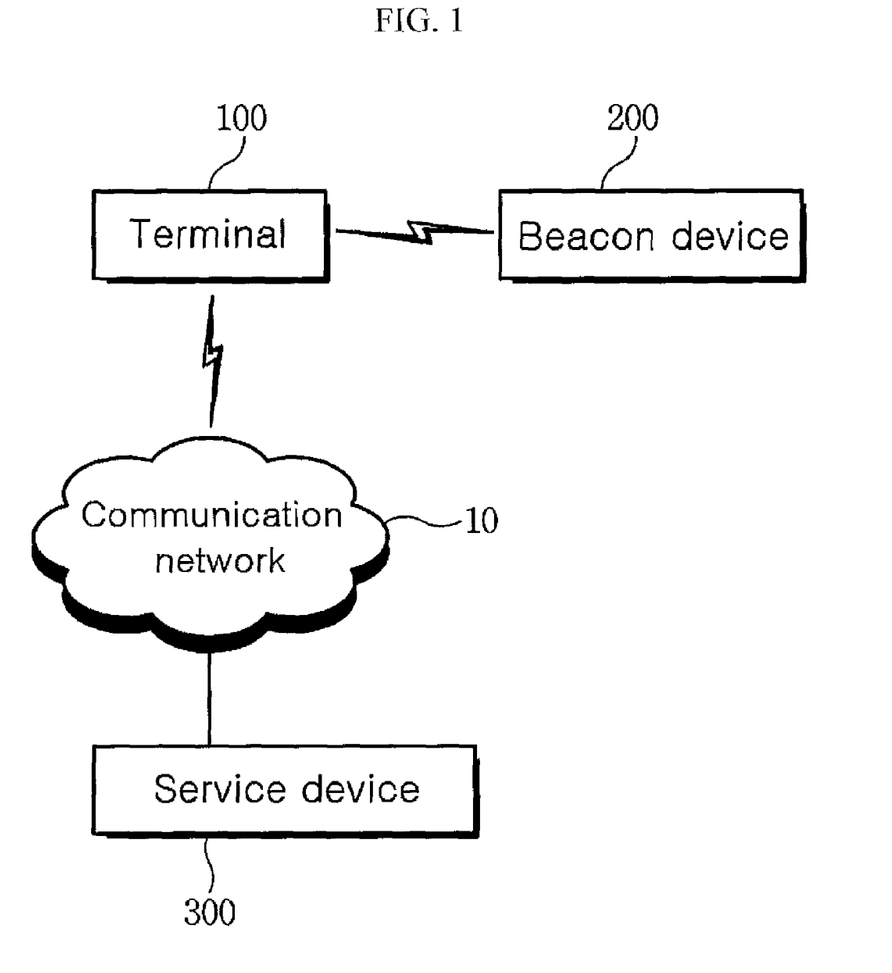
FIG. 1 is a view showing the configuration of a hybrid-typed local wireless data communication system according to an embodiment of the present invention.

FIG. 1 is a view showing the configuration of a hybrid-typed local wireless data communication system according to an embodiment of the present invention.

Referring to FIG. 1, a hybrid-typed local wireless data communication system may include one or more terminals 100, one or more beacon devices 200 and a service device 300 which are interconnected via a communication network 10.

Each terminal 100 refers to a terminal capable of transmitting/receiving various types of data via the communication network according to key manipulation by a user and may be one of a tablet PC, a laptop, a personal computer (PC), a smartphone, a personal digital assistant (PDA), a smart TV, a mobile communication terminal and so on.

The terminal 100 may also be a terminal capable of voice or data communication using the communication network and may include a browser for communication with the service device 300 via the communication network 10, a memory storing programs and protocols, a microprocessor for executing various programs to control various components. That is, the terminal 100 may be any terminal as long as it can conduct server-client communication with the service device 300 and provide mobile services, broadly including communication computing devices such as a notebook computer, a mobile communication terminal, a PDA and so on. The terminal 10 may include, but not limited to, a touch screen.

The terminal 100 may also be a terminal for conducting one or more of local wireless data communications, including, for example, BT (BlueTooth) Classic, BLE (Bluetooth Low Energy) and WiFi. The terminal 100 can scan a hybrid-typed beacon signal broadcast from the beacon device 200 or based on a local wireless data communication scheme supported by the terminal at a request from a user and can use unique beacon identification information of the beacon device 200 contained in the scanned beacon signal to receive service information, which is provided by a store at which the beacon device 200 is located, from the service device 300. In addition, terminal 100 can make access to the service device 300 via the local wireless data communication supported by the terminal and exchange messages for service provision with the service device 300. Hereinafter, in the embodiment of the present invention, hybrid-typed local wireless communication systems such as, for example, BT (BlueTooth) Classic, BLE (Bluetooth Low Energy) and WiFi will be described. It is here noted that the present invention is not limited to the above-mentioned communication systems but may be applied to any communication systems as long as they can conduct local wireless data communication with the beacon device 200.

In particular, the terminal 100 according to the embodiment of the present invention can use a hybrid-typed beacon signal broadcast via the hybrid local wireless data communication to receive, install and store an application capable of recognizing one or more beacon devices 20 from the service device 300.

The beacon device 200 according to the embodiment of the present invention is located in a specified space and can conduct the hybrid-typed local wireless communication with one or more terminals 100, that is, communication with one or more terminals via a plurality of local wireless data communication systems, and transmit the hybrid-typed beacon signal to the one or more terminals. The beacon device 200 can also transmit/receive information related to services provided in the specified space in association with the service device 300 via Internet.

The service device 300 can provide information related to the service provided in the specified space (for example, a store) in which the beacon device 200 is located, in association with the terminal 100 and then the beacon device 200 via the communication network 100, i.e., the Internet. This service device 300 can receive unique beacon identification information, which is contained in the hybrid-typed beacon signal received via the local wireless communication supported by the terminal 100, from the terminal 100, extract service information provided from a store mapped to the received unique beacon identification information, and provide the extracted service information to the terminal 100.

The terminal 100 and the service device 300 are associated to each other via the communication network 10. The communication network 10 used herein may refer to a network capable of data with Internet protocols using a variety of wired/wireless communication techniques such as Internet, intranets, mobile communication networks, satellite communication network and the like. In addition, the communication network 10 stores computing resources such as hardware, software and so on in association with the service device 300. In a broader sense, the communication network 10 includes closed networks such as LAN (Local Area Network), WAN (Wide Area Network) and the like, opened networks such as Internet and the like, networks such as CDMA (Code Division Multiple Access), WCDMA (Wideband Code Division Multiple Access), GSM (Global System for Mobile Communications), LTE (Long Term Evolution), EPC (Evolved Packet Core) and the like, and the next generation networks and computing networks to be implemented in the future.

The configuration of the terminal according to the embodiment of the present invention in the above-configured hybrid-typed local wireless data communication system will be described in more detail below with reference to the accompanying drawings.

Figure 2:
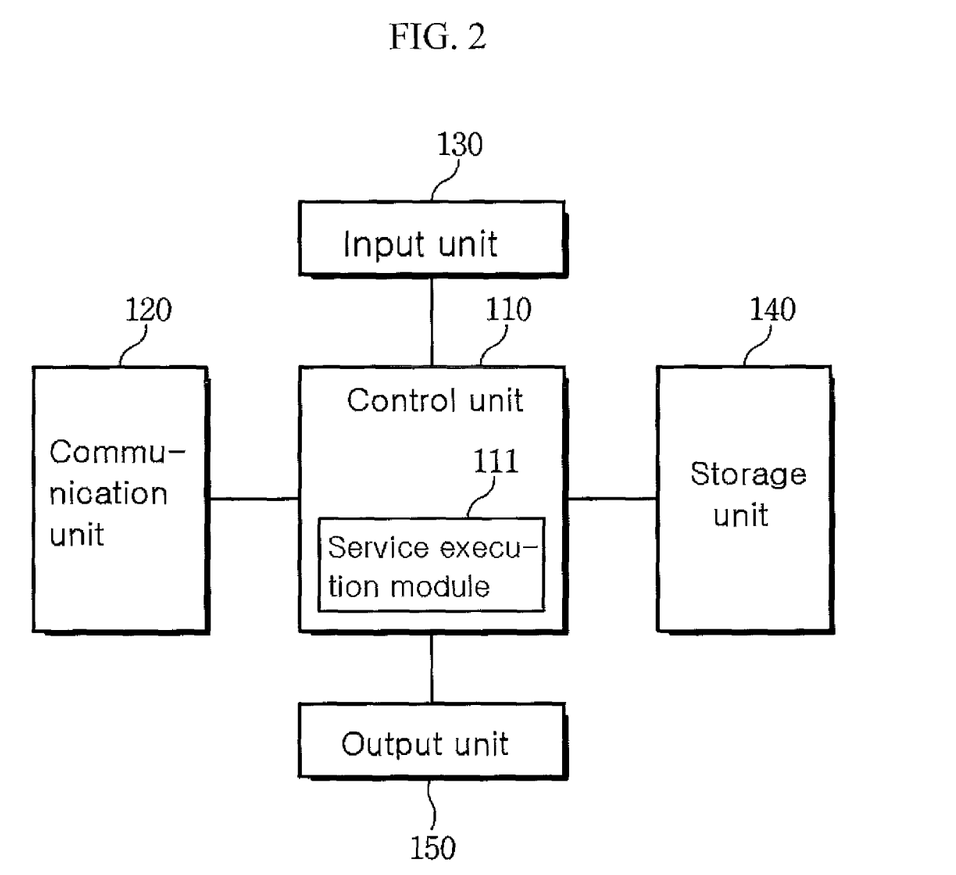
FIG. 2 is a view showing the configuration of a terminal in the hybrid-typed local wireless data communication system according to an embodiment of the present invention.

FIG. 2 is a view showing the configuration of a terminal in the hybrid-typed local wireless data communication system according to the embodiment of the present invention.

Referring to FIG. 2, the terminal 100 may include a control unit 110, an input unit 120, a communication unit 130, a storage unit 140 and an output unit 150.

The control unit 110 performs the overall control of the terminal 100. In particular, the control unit 110 can control local wireless data communication (for example, Bluetooth Classic, Bluetooth Low Energy and WiFi communications) with the beacon device 200 and perform a process of using a hybrid-typed beacon signal generated from the beacon device 200 to receive services provided in a specified space (for example, a store) in which the beacon device 200 is located. To this end, the control unit 110 may include a service execution module 112.

The service execution module 111 can recognize the beacon device 200 from the service device 300 and receive and install an application for service provided in a store in which the recognized beacon device 200 is located. When executing the application at a request from a user, the service execution module 111 can check a local wireless communication system supported by the module 111 and scan a hybrid-typed beacon signal which can be received via the checked local wireless communication system.

In addition, when executing the application received from the service device 300 and receiving the hybrid-typed beacon signal via local wireless data communication supported according to terminal environments, the service execution module 111 checks the unique beacon identification information of the beacon device 200 through the received hybrid beacon. Then, the service execution module 111 can transfer the checked unique beacon identification information to the service device 300 and receive service information corresponding to the unique beacon identification information from the service device 300.

In more detail, when a first local wireless communication system (for example, BLE (Bluetooth Low Energy)) is supported in the terminal 100, the service execution module 111 can scan a first hybrid-typed beacon signal (for example, a BLE beacon signal) broadcast at a preset first broadcasting period by the beacon device 200 through the first local wireless communication system and transfer the unique beacon identification information contained in the scanned first beacon signal to the service device 300. Here, the BLE beacon signal scanned through the BLE communication may contain a major value, a minor value, UUID (Unique User Identifier), transmission signal (Tx) information and so on. That is, the BLE beacon signal contains UUID as the unique beacon identification information and is broadcast from the beacon device 200.

In addition, when a second local wireless communication system (for example, WiFi) is supported in the terminal 100, the service execution module 111 can scan a second hybrid-typed beacon signal (a WiFi beacon signal) broadcast at a preset second broadcasting period by the beacon device 200 through the second local wireless communication system and transfer the unique beacon identification information contained in the scanned second beacon signal to the service device 300. Here, the WiFi beacon signal scanned through the WiFi communication may contain SSID (Service Set Identifier) as the unique beacon identification information and is broadcast from the beacon device 200.

In addition, when a third local wireless communication system (BlueTooth (BT) Classic) is supported in the terminal 100, the service execution module 111 can transmit a beacon identification information request signal (Inquiry) to the beacon device 200 through the third local wireless communication system and, upon a third beacon signal (BT signal) from the beacon device 200, transfer the unique beacon identification information contained in the received third beacon signal to the service device 300. Here, the BT Classic beacon signal received through the BT Classic communication may contain a Bluetooth MAC address as the unique beacon identification information and is broadcast from the beacon device 200.

In addition, the service execution module 111 can use the hybrid-typed beacon signal broadcast from the beacon device 200 to recognize the beacon device 200 and access the recognized beacon device 200 to transmit/receive a message related to services provided in a specified space in which the beacon device 200 is located.

The communication unit 120 can conduct communication with the service device 300 via the communication network 10 to transmit/receive messages related to services provided through the local wireless communication (for example, Bluetooth Classic, Bluetooth Low Energy and WiFi). The communication unit 120 can transmit/receive data through a variety of communication systems including wired and wireless communication systems. In addition, the communication unit 120 can transmit/receive data through one or more communication systems. To this end, the communication unit 120 may include a plurality of communication modules for transmitting/receiving data through different communication systems.

The input unit 130 can generate a user input signal corresponding to user's request or information according to a manipulation from a user. The input unit 130 may be implemented by a variety of input means which is currently available or will be available in the future, including, for example, general input devices such as a keyboard, a mouse, a joystick, a touch screen, a touch pad and so on, and a gesture input means for sensing user's motion to generate a particular input signal. In particular, the input unit 130 according to an embodiment of the present invention can generate a Bluetooth communication execution (Bluetooth On) input signal and an application execution input signal.

The storage unit 140 stores information required to operate the terminal 100. In particular, the storage unit 140 according to an embodiment of the present invention can store information related to the beacon device 200 recognized through a hybrid-typed beacon signal and information related to applications and services provided from the service device 300. Examples of the storage unit 140 may include magnetic media such as a hard disk, a floppy disk and a magnetic tape, optical media such as CR-ROM (Compact Disk Read Only Memory) and DVD (Digital Video Disk), magneto-optical media such as a floptical disk or the like, ROM, RAM (Random Access Memory), a flash memory, and so on.

In addition, the storage unit 140 stores application programs required to operate functions according to an embodiment of the present invention, and screen images and so on to be displayed on a display of the output unit 150. If the display is a touch screen, the storage unit 140 may store various typed of key maps and menu maps for operation of the touch screen. The storage unit 140 may store an OS (Operating System) for booting of the terminal 100 and operation of the above-described components, and a variety of user applications.

The output unit 150 is a means for allowing a user to recognize results and states of the operation of the terminal 100 and may include a display for displaying the results and states visually through a screen, a speaker for outputting an audible sound, and so on. In particular, the output unit 150 according to an embodiment of the present invention can output an execution screen for an application driven in the terminal 100 and display the received service information on the execution screen based on information on the scanned hybrid-typed beacon signal and the unique beacon identification information contained in the scanned beacon signal.

Next, a configuration of the beacon device in the hybrid-typed local wireless data communication system will be described in more detail with reference to the drawings.

Figure 3:
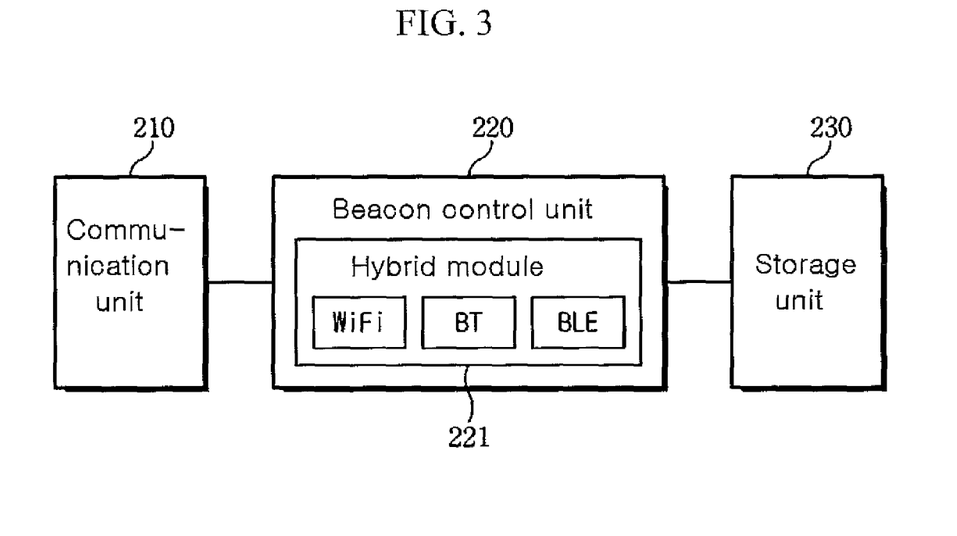
FIG. 3 is a view showing the configuration of a beacon device in the hybrid-typed local wireless data communication system according to an embodiment of the present invention.

FIG. 3 is a view showing the configuration of the beacon device in the hybrid-typed local wireless data communication system according to an embodiment of the present invention.

Referring to FIG. 3, the beacon device 200 may include a communication unit 210, a beacon control unit 220 and a storage unit 230.

The communication unit 210 according to an embodiment of the present invention can access one or more terminals 100 via various types of local wireless data communications, i.e., hybrid-typed local wireless data communication and broadcast or transmit a hybrid beacon signal generated according to the hybrid-typed local wireless data communication to the terminal 100. In addition, the communication unit 210 can communicate with the service device 300 via the local wireless data communication or Internet.

The beacon control unit 220 may include a hybrid module 221 supporting functions for a plurality of local wireless data communication systems. Here, the hybrid module 221 can perform various types of hybrid-typed local wireless data communications, for example, two or more of Bluetooth (BT) Classic, BLE (Bluetooth Low Energy) and WiFi communication systems or a combination thereof.

Then, the beacon control unit 220 can generate a hybrid-typed beacon signal at a preset period or a request and transmit the generated hybrid-typed beacon signal to one or more terminals 200. Here, the hybrid-typed beacon signal may contain unique beacon identification information including one or more of unique identifier, transmission power and beacon signal broadcasting period, based on the local wireless data communication systems.

In more detail, the beacon control unit 220 can generate a first beacon signal (for example, a BLE beacon signal) at a preset first broadcasting period based on a first local wireless communication system (for example, a BLE communication system) and broadcast the generated first beacon signal as the hybrid-typed beacon signal. At this time, the beacon control unit 220 can generate the first beacon signal containing UUID as the unique beacon identification information.

In addition, the beacon control unit 220 can generate a second beacon signal (a WiFi beacon signal) at a preset second broadcasting period based on a second local wireless communication system (for example, a WiFi communication system) and broadcast the generated second beacon signal as the hybrid-typed beacon signal. At this time, the beacon control unit 220 can generate the second beacon signal containing SSID as the unique beacon identification information.

In addition, upon receiving a beacon identification information request signal from a particular terminal 100 through a third local wireless communication system (for example, a Bluetooth (BT) Classic communication system), the beacon control unit 220 can generate a third beacon signal (BT beacon signal) containing its own unique beacon identification information. Thus, the beacon control unit 220 can transmit the third beacon signal generated through the third local wireless communication system, as the hybrid-typed beacon signal, to the particular terminal 100. At this time, the beacon control unit 220 can generate the third beacon signal containing a Bluetooth MAC address as the unique beacon identification information.

The storage unit 230 can store information related to the hybrid-typed beacon signal generated based on a plurality of local wireless data communication systems. Examples of the storage unit 230 may include magnetic media such as a hard disk, a floppy disk and a magnetic tape, optical media such as CR-ROM (Compact Disk Read Only Memory) and DVD (Digital Video Disk), magneto-optical media such as a floptical disk or the like, ROM, RAM (Random Access Memory), a flash memory, and so on.

Next, a configuration of the service device in the hybrid-typed local wireless data communication system will be described in more detail with reference to the drawings.

Figure 4:
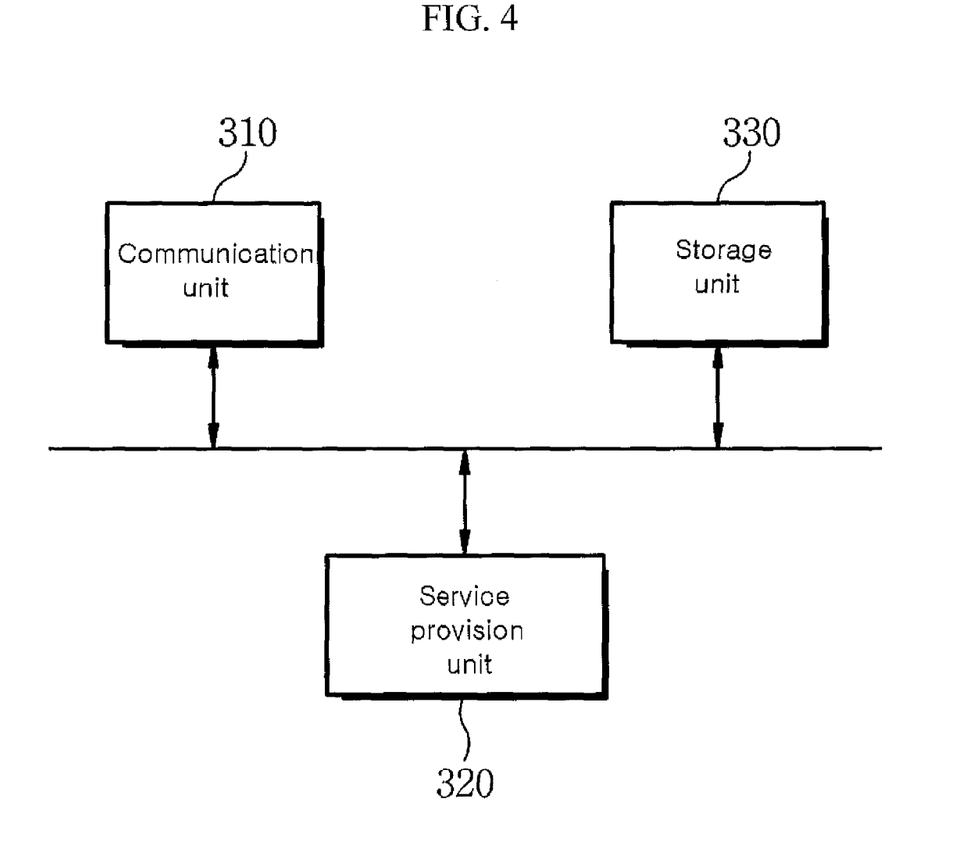
FIG. 4 is a view showing the configuration of a service device in the hybrid-typed local wireless data communication system according to an embodiment of the present invention.

FIG. 4 is a view showing the configuration of the service device in the hybrid-typed local wireless data communication system according to an embodiment of the present invention.

Referring to FIG. 4, the service device 300 may include a communication unit 310, a service provision unit 320 and a storage unit 330.

The communication unit 310 can perform communication with one or more terminals 100 and one or more beacon devices 200 via the communication network 10 to transmit/receive messages related to services provided according to hybrid-typed local wireless communication. In particular, the communication unit 310 can transmit service information corresponding to beacon identification information, which is received from a terminal 100, to the terminal 100. The communication unit 310 can transmit/receive data through a variety of communication systems including wired and wireless communication systems. In addition, the communication unit 120 can transmit/receive data through one or more communication systems. To this end, the communication unit 310 may include a plurality of communication modules for transmitting/receiving data through different communication systems.

The service provision unit 320 can register service information related to services provided in a store where the beacon device 200 transmitting the hybrid-typed beacon signal according to a variety of local wireless communication systems is located, or search the service information from a device (not shown) located in the store through communication with the beacon device 200 at a request.

The service provision unit 320 can receive the unique beacon identification information contained in the hybrid-typed beacon signal, which is received through the local wireless communication supported in the terminal 100, from the terminal 200. Accordingly, the service provision unit 320 can extract service information provided from a store mapped to the received unique beacon identification information, and provide the extracted service information to the terminal 100.

The storage unit 330 can store service information corresponding to the unique beacon identification information. More specifically, the storage unit 330 can store device information of the beacon devices 200 received from the terminal 100. Examples of the storage unit 330 may include magnetic media such as a hard disk, a floppy disk and a magnetic tape, optical media such as CR-ROM (Compact Disk Read Only Memory) and DVD (Digital Video Disk), magneto-optical media such as a floptical disk or the like, ROM, RAM (Random Access Memory), a flash memory, and so on.

A method for hybrid-typed local wireless data communication in the above-configured hybrid-typed local wireless data communication system will now be described in detail with reference to the accompanying drawings.

Figure 5:
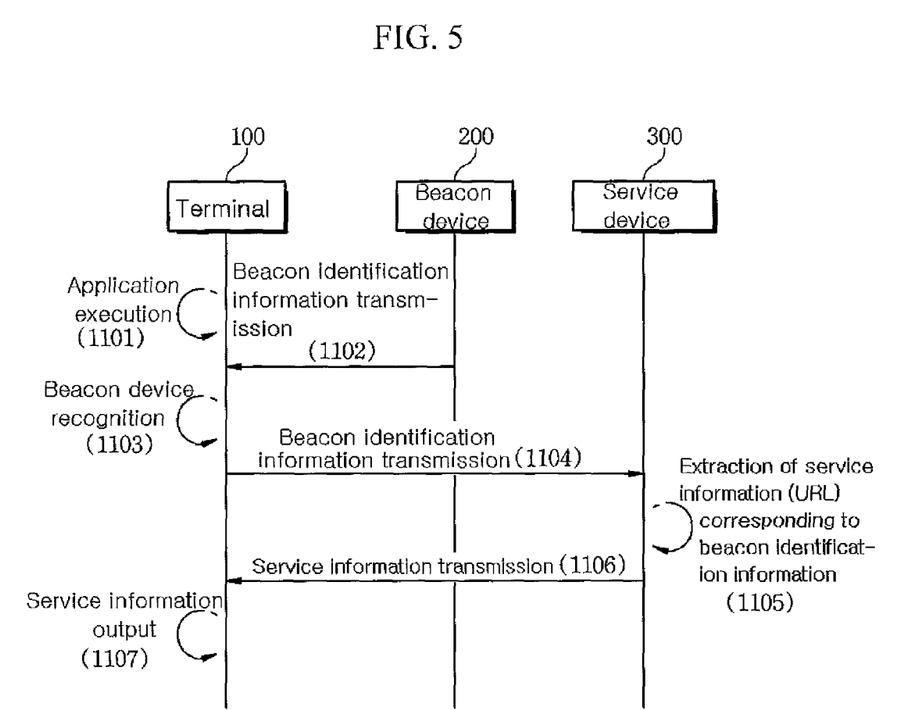
FIG. 5 is a view showing a method for hybrid-typed local wireless data communication according to an embodiment of the present invention.

FIG. 5 is a view showing a method for hybrid-typed local wireless data communication according to an embodiment of the present invention.

Referring to FIG. 5, at Step 1101, the terminal 100 receives and installs an application for service provision according to the hybrid-typed local wireless data communication from the service device 300 and executes the application at a request from a user.

At this time, the beacon device 200 generates a hybrid-typed beacon signal at a preset period or a request through a hybrid module supporting functions for a plurality of local wireless data communication systems. Then, at Step 1102, when the period comes or there is a request from the terminal 100, the beacon device 200 broadcasts or transmits the generated hybrid-typed beacon signal to the terminal 100.

Accordingly, at Step 1103, the terminal 100 checks the local wireless data communication system supported by the terminal 100 according to terminal environments through an application, and scans the hybrid-typed beacon signal received through the checked local wireless data communication. Then, the terminal 100 checks the unique beacon identification information contained in the scanned hybrid-typed beacon signal and recognizes the beacon device 200 using the checked unique beacon identification information.

Thereafter, at Step 1104, the terminal 100 transmits the checked unique beacon identification information to the service device 300.

Accordingly, at Step 1105, the service device 300 can extract registered service information (for example, registered event information, store information, goods information, payment information and so on) corresponding to the beacon identification information, or search the service information provided in a certain space (for example, a store) where the beacon device 200 is located through communication with the beacon device 200 checked through the beacon identification information. In addition, the service device 300 can collect or search the service information through a variety of methods using the received beacon identification information.

Thereafter, at Step 1106, the service device 300 transmits the extracted or searched service information to the terminal 100.

Accordingly, at Step 1107, the terminal 100 can display the service information received from the service device 300 on an application execution screen.

Recorded program instructions may be specially designed and configured for the present invention or may be ones which are known and available to those skilled in the art of computer software. Examples of recording media may include hardware devices specialized to store and execute program instructions, including magnetic media such as a hard disk, a floppy disk and a magnetic tape, optical media such as CR-ROM (Compact Disk Read Only Memory) and DVD (Digital Video Disk), magneto-optical media such as a floptical disk or the like, ROM, RAM (Random Access Memory), a flash memory, and so on. Examples of the program instructions may include machine language codes created by a compiler, and high level language codes which can be executed by a computer using an interpreter or the like. These hardware devices may be configured to be operated as one or more software modules to perform the operation of the present invention, and vice versa.

Computer programs (also known as programs, software, software applications, scripts or codes) loaded on the device of the present invention and executed to implement the method of the present invention may be written in any forms of programming languages including compiled or interpreted languages and a priori or procedural languages and may be deployed in any forms including stand-alone programs, modules, components, subroutines or other units suitable for use in computing environments. The computer programs do not necessarily correspond to files of a file system. The programs may be stored in a single file provided for a requested program, multiple interoperating files (for example, files storing one or more modules, subprograms or some of codes), or a portion of file retaining other programs and data (for example, one or more scripts stored in a markup language document). The computer programs may be located in one site or distributed over a plurality of sites so that the programs can be executed on multiple computers interconnected by a communication network or a single computer.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

Although details of various particular implementations are set forth in the specification, these details are not intended to limit the scope of the invention or subject matters but should be understood as descriptions for features unique to particular embodiments of the present invention. Features described in the context of individual embodiments in the specification may be implemented in combination in a single embodiment. Conversely, various features described in the context of single embodiment may be implemented individually or in any proper sub combinations in multiple embodiments. Further, although features are operated in particular combinations and may be delineated as initially claimed so, one or more features may be excluded from the claimed combinations in some cases and the claimed combinations may be changed to sub combinations or modifications thereof.

Likewise, although operations are shown in specific order in the drawings, it should not be understood that these operations have to be performed in the specific order or a sequential manner shown to obtain desirable results or all operations shown have to be performed. In addition, it should not be understood that separation of various system components in the above embodiments is required for all embodiments but it should be understood that program components and systems described in the above embodiments may be integrated into a single software product or may be packaged into multi-software products.

INDUSTRIAL APPLICABILITY

According to the present invention, by constructing a hybrid module supporting functions for a plurality of local wireless data communication systems in a single beacon device with no need to individually install beacon devices to cover all of the plurality of local wireless data communication systems, beacons signals generated in the single beacon device according to the plurality of local wireless data communication systems can be broadcast or transmitted to a relevant terminal at a preset period or a request.

Accordingly, the present invention has an advantage in that installation and management costs of beacon devices can be saved and services can be offered through communication with more user terminals in a certain space such as a store and so on.

The present invention has industrial applicability since it has sufficient commercial availability and operation performance and can be practiced in reality.

What is claimed is:

1. A terminal comprising:
a communication unit which receives a hybrid-typed beacon signal from a beacon device supporting a plurality of local wireless data communication systems and is associated with a service device via a communication network; and
a control unit which is functionally coupled to the communication unit, executes an application received from the service device to receive the hybrid-typed beacon signal through local wireless data communication supported according to terminal environments, checks the unique beacon identification information of the beacon device through the received hybrid-typed beacon signal, transmits the checked unique beacon identification information to the service device for requesting service information provided in a certain space where the beacon device is located, and receives the service information provided in the certain space where the beacon device is located corresponding to the unique beacon identification information from the service device.

2. The terminal according to claim 1, wherein, when a first local wireless communication system is supported, the control unit scans a first hybrid-typed beacon signal broadcast at a preset first broadcasting period through first local wireless communication, and transmits unique beacon identification information contained in the scanned first beacon signal to the service device.

3. The terminal according to claim 1, wherein, when a second local wireless communication system is supported, the control unit scans a second hybrid-typed beacon signal broadcast at a preset second broadcasting period through second local wireless communication, and transmits unique beacon identification information contained in the scanned second beacon signal to the service device.

4. The terminal according to claim 1, wherein, when a third local wireless communication system is supported, the control unit transmits a beacon identification information request signal to the beacon device through third local wireless communication and, upon receiving a third beacon signal from the beacon device, transmits unique beacon identification information contained in the received third beacon signal to the service device.

5. A hybrid-typed local wireless data communication method comprising:
generating, by a beacon device, a hybrid-typed beacon signal at a preset period or a request through a hybrid module supporting a plurality of local wireless data communication systems;
transmitting, by the beacon device, the generated hybrid-typed beacon signal to one or more terminals;
receiving, by the one or more terminals, the hybrid-typed beacon signal through local wireless data communication supported according to terminal environments;

checking, by the one or more terminals, unique beacon identification information of the beacon device through the received hybrid-typed beacon signal;

requesting, by the one or more terminals, a service device for service information provided in a certain space where the beacon device is located, by using the checked unique beacon identification information;

receiving, by the service device, the checked unique beacon identification information from the one or more terminals; and transmitting, by the service device, service information provided in the certain space mapped to the received unique beacon identification information to the one or more terminals.

6. A non-transitory computer-readable storage medium storing a computer program comprising a set of instructions, when executed, arranged to cause a computer to implement the method according to claim 5.

7. A hybrid-typed local wireless data communication system, comprising:

a beacon device which includes a hybrid module supporting a plurality of local wireless data communication systems, generates a hybrid-typed beacon signal at a preset period or a request through the hybrid module and transmits the generated hybrid-typed beacon signal to one or more terminals;

the one or more terminals which receive the hybrid-typed beacon signal through local wireless data communication supported according to terminal environments, checks unique beacon identification information of the beacon device through the received hybrid-typed beacon signal and requests a service device for service information provided in a certain space where the beacon device is located, by using the checked unique beacon identification information; and the service device which receives the checked unique beacon identification information from the one or more terminals and transmits the service information provided in the certain space mapped to the received unique beacon identification information to the one or more terminals.

8. The hybrid-typed local wireless data communication system according to claim 7, wherein the hybrid module is configured by a combination of two or more of Bluetooth Classic, Bluetooth Low Energy and WiFi communication systems.

9. The hybrid-typed local wireless data communication system according to claim 7, wherein the beacon device generates a first beacon signal at a preset first broadcasting period according to a first local wireless communication system, broadcasts the generated first beacon signal as the hybrid-typed beacon signal, generates a second beacon signal at a preset second broadcasting period according to a second local wireless communication system, and broadcasts the generated second beacon signal as the hybrid-typed beacon signal.

* * * * *